(12) United States Patent
Stufflebeam et al.

(10) Patent No.: US 9,053,048 B2
(45) Date of Patent: Jun. 9, 2015

(54) SYSTEM AND METHOD FOR EXTENDING A BIOMETRIC FRAMEWORK

(71) Applicant: Dell Products L.P., Round Rock, TX (US)

(72) Inventors: Kenneth Wade Stufflebeam, Georgetown, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/715,706

(22) Filed: Dec. 14, 2012

(65) Prior Publication Data

US 2014/0173639 A1    Jun. 19, 2014

(51) Int. Cl.
*G06F 3/00* (2006.01)
*G06F 9/44* (2006.01)
*G06F 9/46* (2006.01)
*G06F 13/00* (2006.01)
*G06F 13/10* (2006.01)

(52) U.S. Cl.
CPC .................................. *G06F 13/102* (2013.01)

(58) Field of Classification Search
None
See application file for complete search history.

(56) References Cited

U.S. PATENT DOCUMENTS

| | | | |
|---|---|---|---|
| 7,522,751 B2 * | 4/2009 | White et al. | 382/115 |
| 2008/0148046 A1 * | 6/2008 | Glancey | 713/156 |
| 2010/0201498 A1 * | 8/2010 | Griffin | 340/10.52 |
| 2011/0083170 A1 | 4/2011 | Kesanupalli et al. | |
| 2011/0145904 A1 | 6/2011 | Pizano et al. | |
| 2011/0157347 A1 | 6/2011 | Kalocsai | |

OTHER PUBLICATIONS

Microsoft Corporation, "Introduction to the Windows Biometric Framework (WBF): Guidelines for IHV, ISVs, and OEMs", Aug. 23, 2010, 12 pages.

* cited by examiner

*Primary Examiner* — H S Sough
*Assistant Examiner* — William C Wood
(74) *Attorney, Agent, or Firm* — Winstead PC

(57) ABSTRACT

In one embodiment, a method includes providing a biometric framework in a native environment thereof. The biometric framework includes a biometric service, a biometric device interface (BDI), and a BDI driver. The biometric service includes a biometric unit relative to a biometric sensor. The biometric unit includes a sensor adapter, an engine adapter, and a storage adapter. The method further includes extending the biometric framework to store biometric templates in a secondary database maintained in a secondary location. The extending includes extending the storage adapter to support storage in the secondary location.

20 Claims, 6 Drawing Sheets

SYSTEM AND METHOD FOR EXTENDING A BIOMETRIC FRAMEWORK

BACKGROUND

1. Technical Field

The present invention relates generally to biometric storage and access and more particularly, but not by way of limitation, to systems and methods for extending a biometric framework.

2. History of Related Art

Windows Biometric Framework (WBF), as introduced in Windows® 7 and 8 operating systems, provides a set of components that standardizes the use of fingerprint biometric devices. Microsoft and Windows are either registered trademarks or trademarks of Microsoft Corporation in the United States and/or other countries. As part of its functionality, WBF maintains a biometric database of fingerprint biometric templates, for example, on a computer hard drive, for access in its native environment (e.g., Windows® 7 or 8 operating system). The biometric database, however, is not necessarily accessible outside of WBF's native environment. For example, the computer hard drive may be encrypted, employ an incompatible file structure, or not be connected at a given point in time.

Many situations exist in which it would be advantageous to access the biometric database outside of WBF's native environment. For example, it may be desirous to perform biometric authentication in a pre-boot environment or in a secondary operating-system environment such as, for example, Linux. Traditional solutions entail developing a complete stack of software to support each biometric sensor so that the biometric sensor can maintain biometric storage separate and apart from WBF. Therefore, to implement such solutions, it is necessary to have specific knowledge of each driver and each specific implementation used by biometric-device vendors. Further, the use of an additional stack of software that accesses and stores biometric templates introduces new security risks. Generally, there is not a defined, common method for all devices to store biometric templates and other secret data for access outside of a biometric framework's native environment (e.g., Windows® 7 or 8 operating system).

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on an information handling system, providing a biometric framework in a native environment thereof. The biometric framework includes a biometric service, a biometric device interface (BDI), and a BDI driver. The biometric service includes a biometric unit relative to a biometric sensor. The biometric unit includes a sensor adapter, an engine adapter, and a storage adapter. The method further includes, on the information handling system, extending the biometric framework to store biometric templates in a secondary database maintained in a secondary location. The extending includes extending the storage adapter to support storage in the secondary location.

In one embodiment, an information handling system includes a processing unit. The processing unit is operable to provide a biometric framework in a native environment thereof. The biometric framework includes a biometric service, a biometric device interface (BDI), and a BDI driver. The biometric service includes a biometric unit relative to a biometric sensor. The biometric unit includes a sensor adapter, an engine adapter, and a storage adapter. The processing unit is further operable to extend the biometric framework to store biometric templates in a secondary database maintained in a secondary location. The extension includes extending the storage adapter to support storage in the secondary location.

In one embodiment, a computer-program product includes a computer-usable medium having computer-readable program code embodied therein. The computer-readable program code is adapted to be executed to implement a method. The method includes providing a biometric framework in a native environment thereof. The biometric framework includes a biometric service, a biometric device interface (BDI), and a BDI driver. The biometric service includes a biometric unit relative to a biometric sensor. The biometric unit includes a sensor adapter, an engine adapter, and a storage adapter. The method further includes extending the biometric framework to store biometric templates in a secondary database maintained in a secondary location. The extending includes extending the storage adapter to support storage in the secondary location.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, access to biometric templates outside of a biometric framework's native environment can be facilitated by extending the biometric framework as described herein. For purposes of this patent application, a biometric sensor refers to a device operable to obtain biometric samples. The biometric sample can be, for example, a captured image of a fingerprint. A biometric template, as used herein, refers to a digital reference of distinct characteristics (i.e., biometric factors) that have been extracted from a biometric sample. For example, the biometric templates can be used as a basis for biometric authentication. A biometric application, as used herein, refers to a software application that provides for management and/or utilization of biometric templates. A biometric framework, as used herein, refers to a platform and set of interfaces for managing and servicing biometric sensors. For purposes of this patent application, a native operating-system environment, periodically referenced herein as a native environment, refers to an operating-environment in which a given biometric framework is designed to operate.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
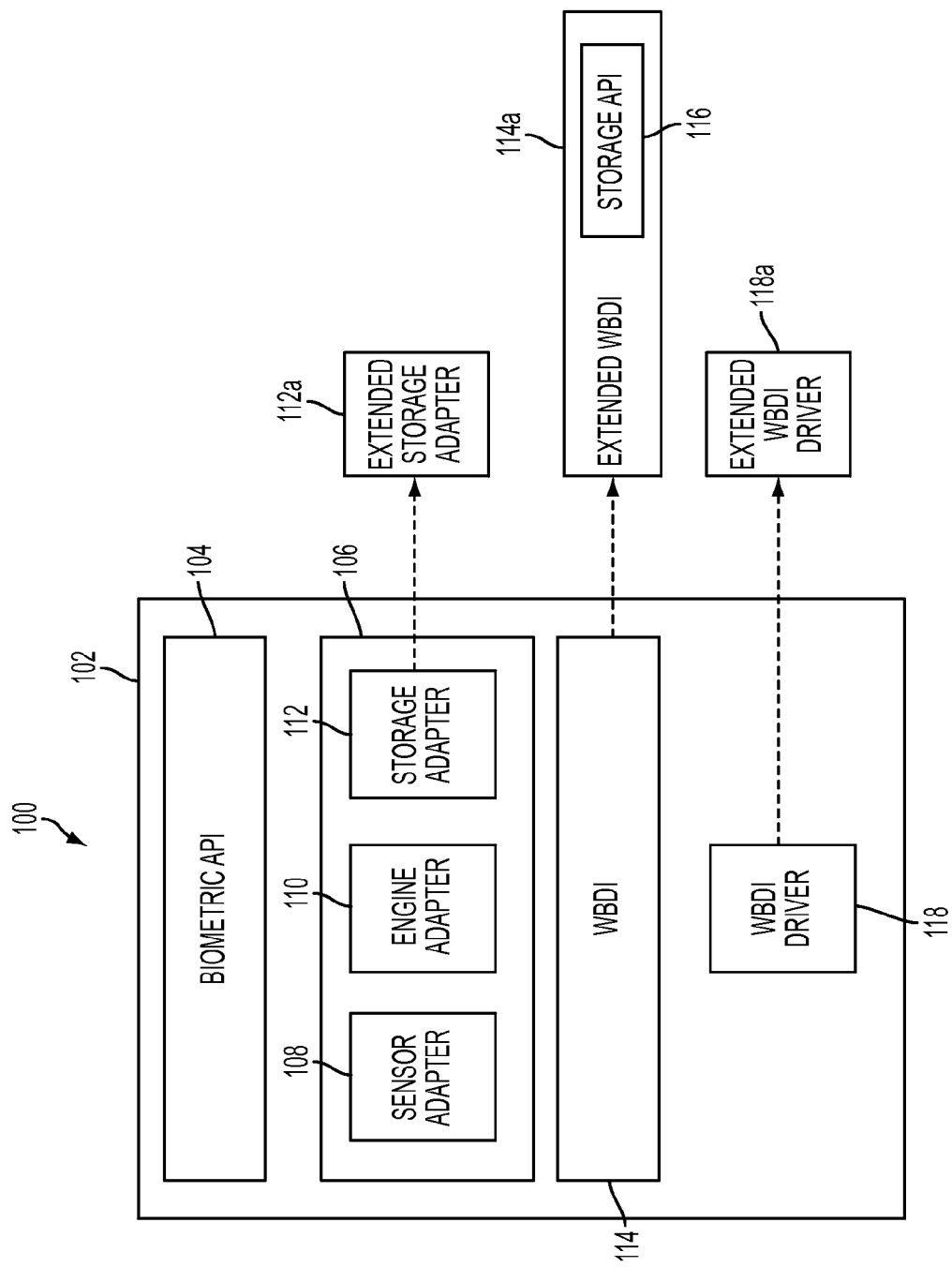
FIG. 1 illustrates an extension of a biometric framework.

FIG. 1 illustrates an extension 100 of a biometric framework 102. For purposes of illustration, the biometric framework 102 corresponds to a Windows Biometric Framework (WBF) as introduced in Windows® 7 and 8 operating systems. The biometric framework 102 includes a biometric application programming interface (API) 104, a biometric service 106, a Windows Biometric Device Interface (WBDI) 114, and a WBDI driver 118. The biometric service 106 further includes a sensor adapter 108, an engine adapter 110, and a storage adapter 112. As described in more detail below, the biometric framework 102 has been extended via an extended storage adapter 112a, an extended WBDI 114a, and an extended WBDI driver 118a. The extended WBDI 114a includes a storage API 116.

The biometric API 104 exposes a set of standard functionality of biometric sensors to biometric applications. The set of standard functionality is typically exposed within a native operating-system environment such as, for example, an environment provided by a Windows® 7 or 8 operating system. The sensor adapter 108, the engine adapter 110, and the storage adapter 112 inter-communicate via the biometric service 106. In a typical embodiment, the sensor adapter 108 performs capture operations for purposes of obtaining biometric samples. The engine adapter 110 performs processing on the biometric samples such as, for example, feature extraction, and generates biometric templates. In addition, the engine adapter 110 matches biometric samples to biometric templates. The storage adapter 112 stores, manages, and retrieves biometric templates from storage. In a typical embodiment, instances of the sensor adapter 108, the engine adapter 110, and the storage adapter 112 relative to a given biometric sensor collectively form a biometric unit. The biometric unit is a software object that represents the given biometric sensor. The WBDI 114 provides a common interface that the WBDI driver 118 uses to expose the given biometric sensor through the biometric service 106.

In a typical embodiment, a limitation of the biometric framework 102 without extension is that the biometric framework 102 only stores biometric templates in a biometric database on a given information handling system. In a typical embodiment, the storage API 116 of the extended WBDI 114a can be used to additionally store biometric templates in a secondary location such as, for example, flash memory on a given biometric sensor. As described in greater detail with respect to FIG. 2, the extended storage adapter 112a extends the storage adapter 112 to call the storage API 116 and request that the biometric templates be stored in the secondary location. The extended WBDI driver 118a extends the WBDI driver 118 to receive calls from the storage API 116 and store the biometric templates in the secondary location as requested. Exemplary operation will be described with respect to FIG. 2.

Figure 2:
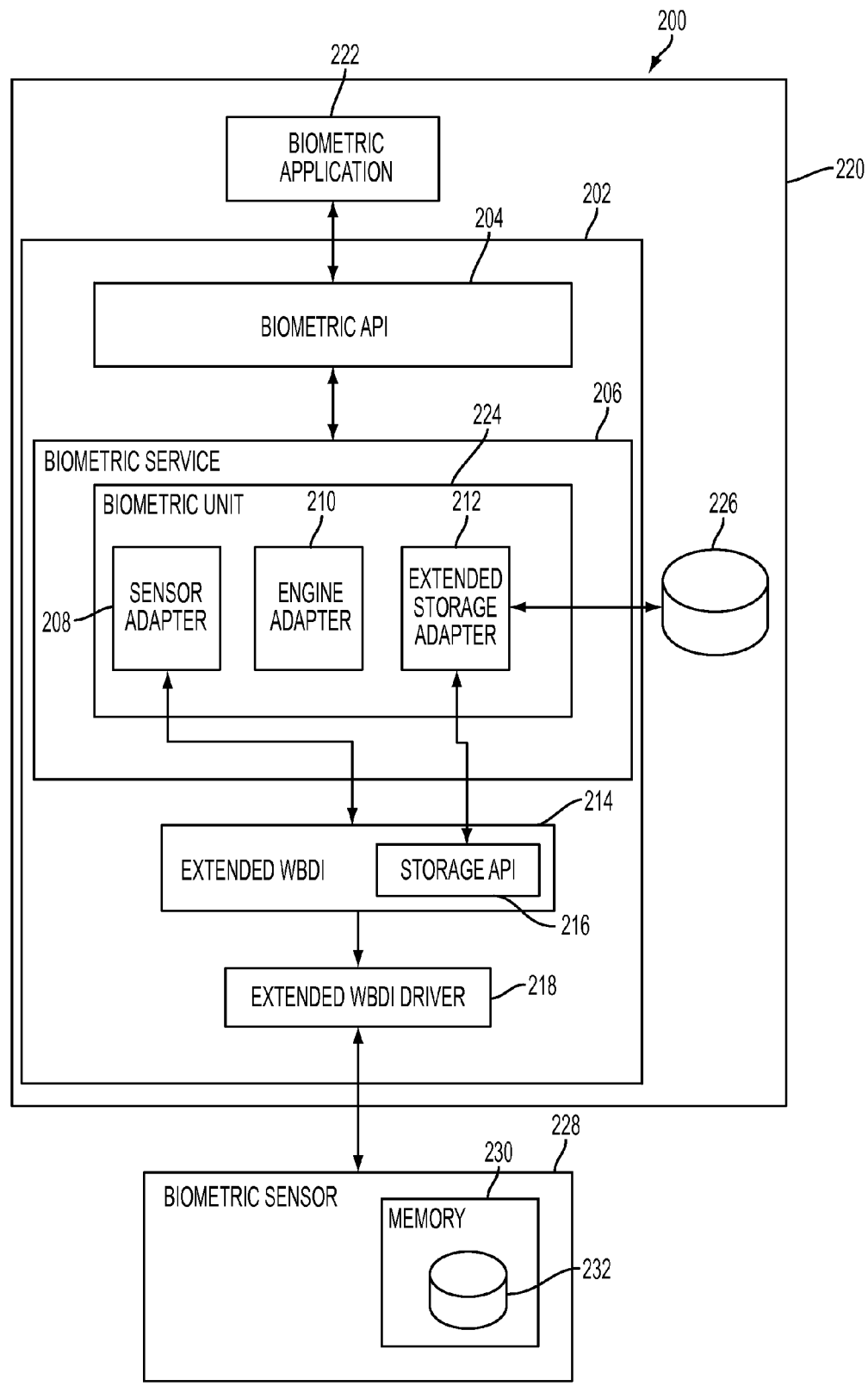
FIG. 2 illustrates an information handling system.

FIG. 2 illustrates an information handling system 200. The information handling system 200 includes a biometric sensor 228 and a biometric database 226. In addition, the information handling system 200 has resident and executing thereon a native operating-system environment 220 of an extended biometric framework 202. The native operating-system environment can be, for example, an environment provided by the Windows® 7 or Windows® 8 operating system. In a typical embodiment, the extended biometric framework 202 is an extended version of WBF. As described in more detail below, the extended biometric framework 202 exposes biometric functionality of the biometric sensor 228 to a biometric application 222.

The extended biometric framework 202 includes a biometric API 204, a biometric service 206, an extended WBDI 214, and an extended WBDI driver 218. The biometric service 206 includes a sensor adapter 208, an engine adapter 210, and an extended storage adapter 212 that collectively form a biometric unit 224 relative to the biometric sensor 228. It should be appreciated that, in various embodiments, the biometric service 206 can include a plurality of biometric units for a plurality of biometric sensors. However, for simplicity of description and illustration, the biometric service 206 is depicted as only including the biometric unit 224 for the biometric sensor 228.

The biometric sensor 228 can be, for example, a fingerprint reader. As shown, the biometric sensor 228 includes flash memory 230 on which a sensor database 232 is stored. In various embodiments, rather than be part of the information handling system 200 as illustrated, the biometric sensor 228 can be external to the information handling system 200 and communicably coupled thereto via a communication standard such as, for example, Universal Serial Bus (USB).

In a typical embodiment, the extended biometric framework 202 has been extended as described with respect to the biometric framework 102 of FIG. 1 and, as a result, enables additional functionality. Specifically, this additional functionality is enabled by the extended storage adapter 212, the storage API 216, and the extended WBDI driver 218. Traditionally, a non-extended storage adapter, as is provided by WBF, stores all biometric templates in a central location such as, for example, the biometric database 226. The biometric templates can be stored as they are enrolled. The biometric database 226 can be resident, for example, on a given information handling system's hard drive. The biometric database 226, however, is not necessarily accessible outside the native operating-system environment 220. As described below, the extended storage adapter 212, the extended WBDI 214, and the extended WBDI driver 218 can rectify this deficiency.

In particular, the extended WBDI 214 has been extended by the addition of a storage API 216. The extended storage adapter 212 and the extended WBDI driver 218 have each been extended to interface with the storage API 214. The storage API 214 specifies functions, data structures, object classes, and/or variables related to storing biometric templates in the sensor database 232. The extended storage adapter 212 has been extended to call the storage API 216 whenever biometric templates are to be stored. The extended WBDI driver 218 has been extended to receive calls made via the storage API 216 and, in response, store biometric templates in the sensor database 232 as instructed.

For example, after creation of a new biometric template by the engine adapter 210, the extended storage adapter 216 can store the new biometric template in the biometric database 226 per WBF standard procedure and, in addition, call the storage API 216 so that the new biometric template is also stored in the sensor database 232. In that way, the extended storage adapter 212 enables concurrent storage of the new biometric template in multiple locations: the biometric database 226 and the sensor database 232. In a typical embodiment, each biometric template is stored in the sensor database 232 such that the biometric template is accessible on a per-user basis.

Further, the storage API 214 logically abstracts how the biometric templates are stored in the sensor database 232 from the extended storage adapter 212. Consequently, the extended storage adapter 212 need not directly interface with either the extended WBDI driver 218 or the biometric sensor 228. In a typical embodiment, this exemplary advantage eliminates any need to define a new storage adapter for each biometric unit such as, for example, the biometric unit 224. Rather, the extended storage adapter 212 can be common across all biometric units. In a typical embodiment, only the extended WBDI driver 218 is specific to the biometric unit 224. Table 1 below lists exemplary functions that can be included as part of the storage API 216.

TABLE 1

| Function | Function Description |
|---|---|
| Storage APIOpenDatabase | Opens existing database. A return code identifies if a database is not present. |
| Storage APICloseDatabase | Closes database. |
| Storage APICreateDatabase | Creates and initializes a new database. |
| Storage APIEraseDatabase | Erases an existing database. |
| Storage APIGetDatabaseSize | Returns database size and available space. |
| Storage APIAddRecord | Adds a record to a database. |
| Storage APIDeleteRecord | Deletes one or more records from a database. |
| Storage APIQueryRecord | Finds all records that match a specified identity and sub-factor. |
| Storage APIGetRecordCount | Returns a number of records in a result set. |
| Storage APIFirstRecord | Sets a result cursor on a first record in a result set. |
| Storage APINextRecord | Moves a result cursor to a next record in a result set. |
| Storage APIGetCurrentRecord | Retrieves contents of a current record in a result set. |

In a typical embodiment, the sensor database 232 stores a database record for each biometric template. In various embodiments, each database record can be identical to a corresponding database record in the biometric database 226. In various other embodiments, each database record can include a subset of data from the biometric database 226 such as, for example, identity values, subfactor values, and template data. The identity values can be, for example, a globally unique identifier (GUID) associated with a biometric template. The subfactor values can be, for example, qualifying characteristics that can be used to further define a biometric factor (e.g., which finger a given fingerprint came from). The template data can be, for example, any data or metadata associated with the given biometric template. Each database record of the sensor database 232 can also include additional data that is not present in the biometric database 226. For example, the database records can include secret data that is used for security purposes in a non-native environment such as, for example, a pre-boot environment. The secret data can be, for example, a shared secret that is used to authenticate either a user or a given biometric application in the non-native environment.

One of ordinary skill in the art will appreciate numerous advantages of the principles outlined above. For example, the sensor database 232 can serve as a backup of a portion of the biometric database 226 relating to the biometric unit 224. Should a need arise, the biometric database 226 can be restored from the sensor database 232. In similar fashion, the sensor database 226 can be used to migrate biometric templates to another environment. In that way, a new biometric database similar to the biometric database 226 could be created based on the sensor database 232.

Figure 3:
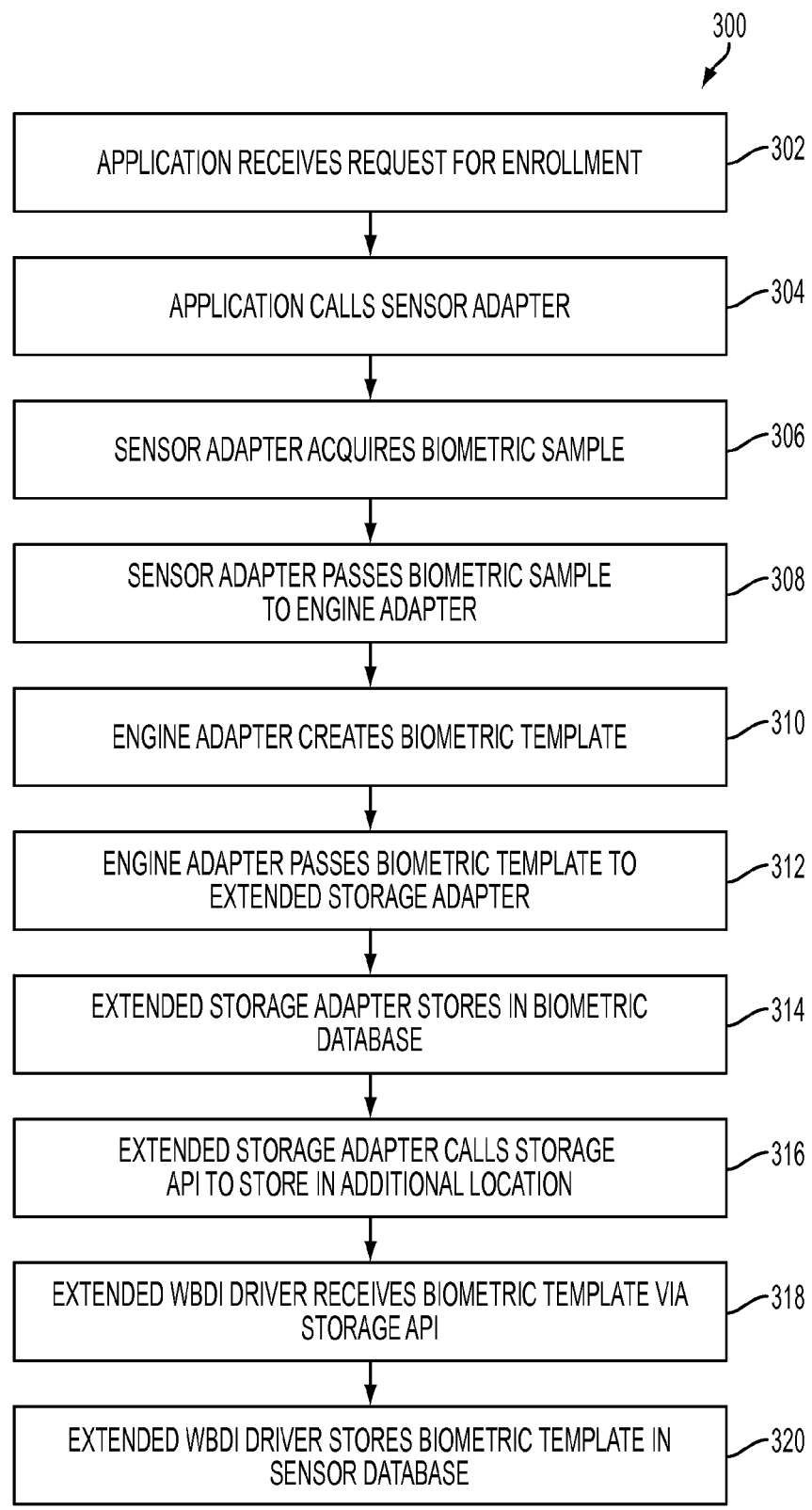
FIG. 3 illustrates a process for storing a biometric template in a native environment of an extended biometric framework.

FIG. 3 illustrates a process 300 for storing a biometric template in a native environment of an extended biometric framework such as, for example, the extended biometric framework 202 of FIG. 2. The extended biometric framework provides a biometric service that includes a sensor adapter, an engine adapter, and an extended storage adapter such as, for example, the sensor adapter 208, the engine adapter 210, and the extended storage adapter 212, respectively, of FIG. 2. The process 300 begins at step 302.

At step 302, a biometric application receives a request from a user to enroll a biometric template by providing a biometric sample (e.g., via a finger swipe). From step 302, the process 300 proceeds to step 304. At step 304, the biometric application calls a sensor adapter of the extended biometric framework so that the biometric sample can be acquired. In various embodiments, multiple biometric samples may be acquired. In a typical embodiment, the biometric application calls the sensor adapter via a biometric API such as, for example, the biometric API 204 of FIG. 2. From step 304, the process 300 proceeds to step 306.

At step 306, the sensor adapter acquires a biometric sample from the user. In a typical embodiment, the sensor adapter accomplishes the acquisition by instructing the biometric sensor to capture the biometric sample. For example, the sensor adapter can so instruct the biometric sensor via an extended WBDI and an extended WBDI driver such as, for example, the extended WBDI 214 and the extended WBDI driver 218, respectively, of FIG. 2. From step 306, the process 300 proceeds to step 308.

At step 308, the sensor adapter passes the biometric sample to the engine adapter. From step 308, the process 300 proceeds to step 310. At step 310, the engine adapter creates the biometric template. From step 310, the process 300 proceeds to step 312. At step 312, the engine adapter passes the biometric template to the extended storage adapter. From step 312, the process 300 proceeds to step 314. At step 314, the extended storage adapter stores the biometric template in a biometric database such as, for example, the biometric database 226 of FIG. 2. From step 314, the process 300 proceeds to step 316.

At step 316, the extended storage adapter calls a storage API such as, for example, the storage API 216 of FIG. 2, so that the biometric template can be stored on flash memory of the biometric sensor. From step 316, the process 300 proceeds to step 318. At step 318, the extended WBDI driver receives the biometric template via the call to the storage API. From step 318, the process 300 proceeds to step 320. At step 320, the extended WBDI driver stores the biometric template in a sensor database within the biometric sensor's flash memory. After step 320, the process 300 ends.

Figure 4:
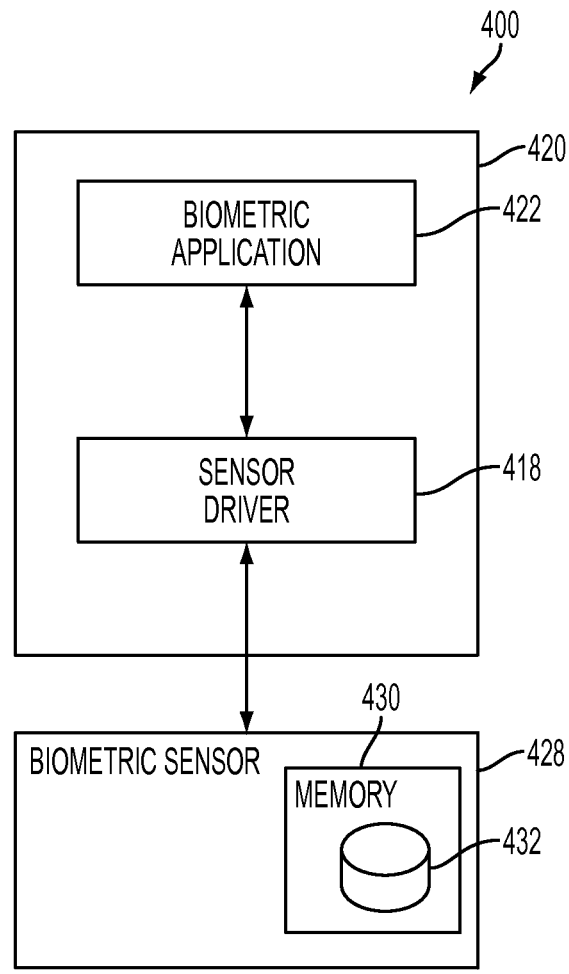
FIG. 4 illustrates an information handling system.

FIG. 4 illustrates an information handling system 400. The information handling system 400 includes a non-native environment 420 of a biometric framework such as, for example, the biometric framework 202 of FIG. 2. The non-native environment 420 can be, for example, a pre-boot environment, a secondary operating-system environment (e.g., Linux), or the like. A biometric application 422 is operable to execute in the non-native environment 420, for example, to facilitate biometric authentication of users.

The biometric application 422 communicates with a sensor driver 418 for a biometric sensor 428. The biometric sensor 428 includes a sensor database 432 in its flash memory 430. In a typical embodiment, the sensor database 432 includes biometric templates that have been stored therein, for example, as described with respect to FIGS. 2-3. However, in contrast to a biometric database maintained by non-extended WBF (e.g., the biometric database 226 of FIG. 2), the sensor database 432 is additionally accessible in the non-native environment 420 by the biometric application 422. In operation, the biometric application 422 communicates with the sensor driver 418 in order to instruct the biometric sensor 428 to perform a requested action such as, for example, biometric verification. An example will be described with respect to FIG. 5.

Figure 5:
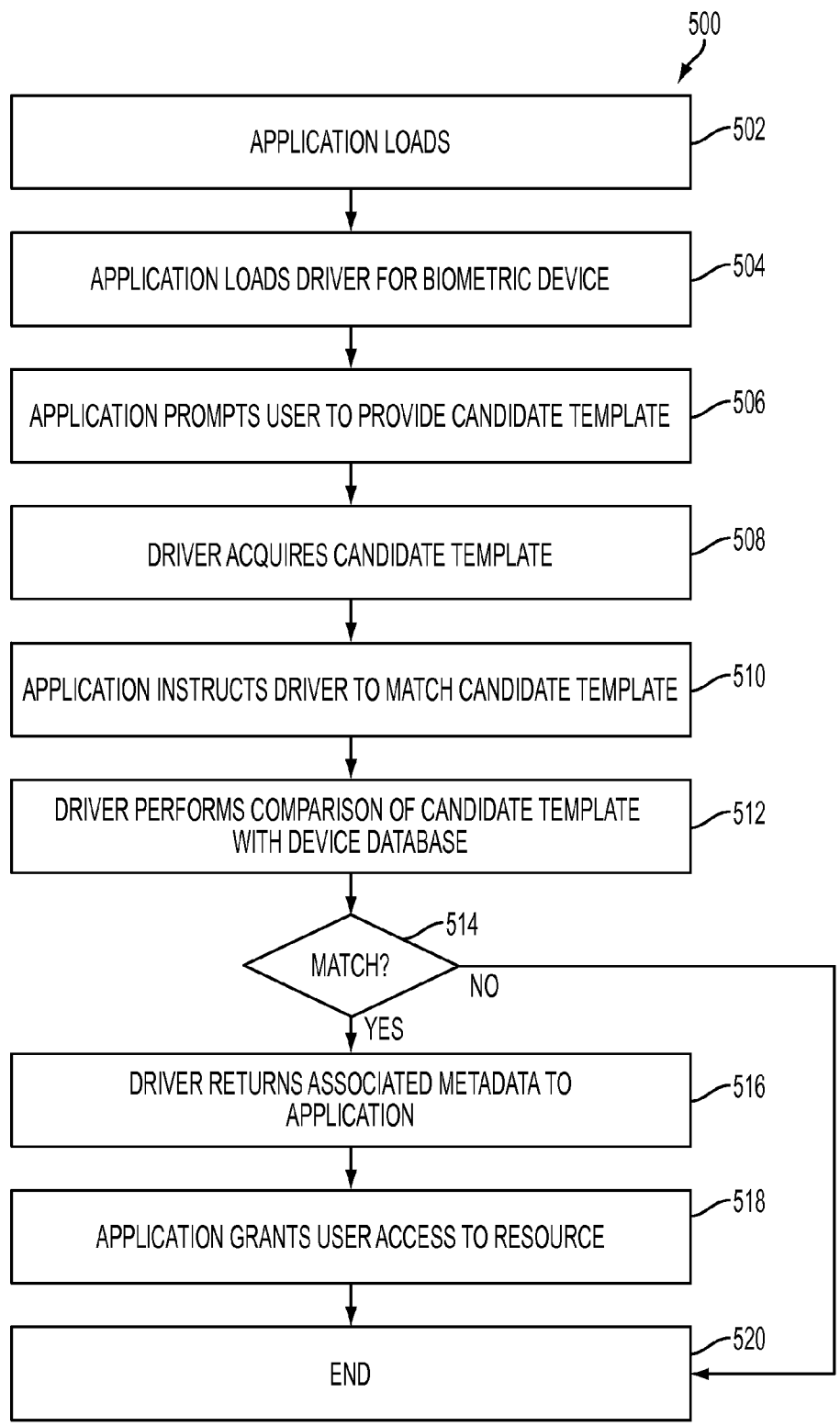
FIG. 5 illustrates a process for performing biometric authentication in a non-native environment.

FIG. 5 illustrates a process 500 for performing biometric authentication in a non-native environment of a given biometric framework. The non-native environment can be, for example, a pre-boot environment or a secondary operating-system environment. The process 500 begins at step 502. At step 502, a biometric application loads in the non-native environment. In a typical embodiment, the biometric application is loaded so that a user can be authenticated before being granted access to a resource such as, for example, access to a computer or a particular operating-system environment. In a typical embodiment, the biometric application operates as described with respect to the biometric application 422 of FIG. 4. From step 502, the process 500 proceeds to step 504.

At step 504, the biometric application loads a sensor driver for a biometric sensor. For example, the sensor driver and the biometric sensor can operate as described with respect to the sensor driver 418 and the biometric sensor 428, respectively, of FIG. 4. In a typical embodiment, the biometric sensor maintains a sensor database such as, for example, the sensor database 432, in its flash memory. From step 504, the process 500 proceeds to step 506. At step 506, the biometric application prompts a user to provide a candidate template. For example, the biometric application may ask the user to swipe their finger. From step 506, the process 500 proceeds to step 508. At step 508, the sensor driver acquires the candidate template from the biometric sensor. From step 508, the process 500 proceeds to step 510.

At step 510, the biometric application instructs the sensor driver to match the candidate template with a biometric template of the sensor database. From step 510, the process 500 proceeds to step 512. At step 512, the sensor driver performs a comparison of the biometric template with the biometric templates of the sensor database. From step 512, the process 500 proceeds to step 514. At step 514, it is determined whether a match with the candidate template has been identified. If not, the process 500 proceeds to step 520 and ends in failure. If it is determined at step 514 that a match with the candidate template has been identified, the process 500 proceeds to step 516. At step 516, the sensor driver returns metadata associated with a matched template to the biometric application. From step 516, the process 500 proceeds to step 518. At step 518, the user is provided access to the requested resource. From step 518, the process 500 proceeds to step 520. At step 520, the process 500 ends.

It should be appreciated that the inventive principles outlined above are not limited to storage in a sensor database on a biometric sensor. Rather, in various embodiments, the inventive principles described above can be leveraged to store biometric templates any secondary location such as, for example, another hard drive, an embedded controller, BIOS, and the like. An example will be described with respect to FIG. 6 below.

Figure 6:
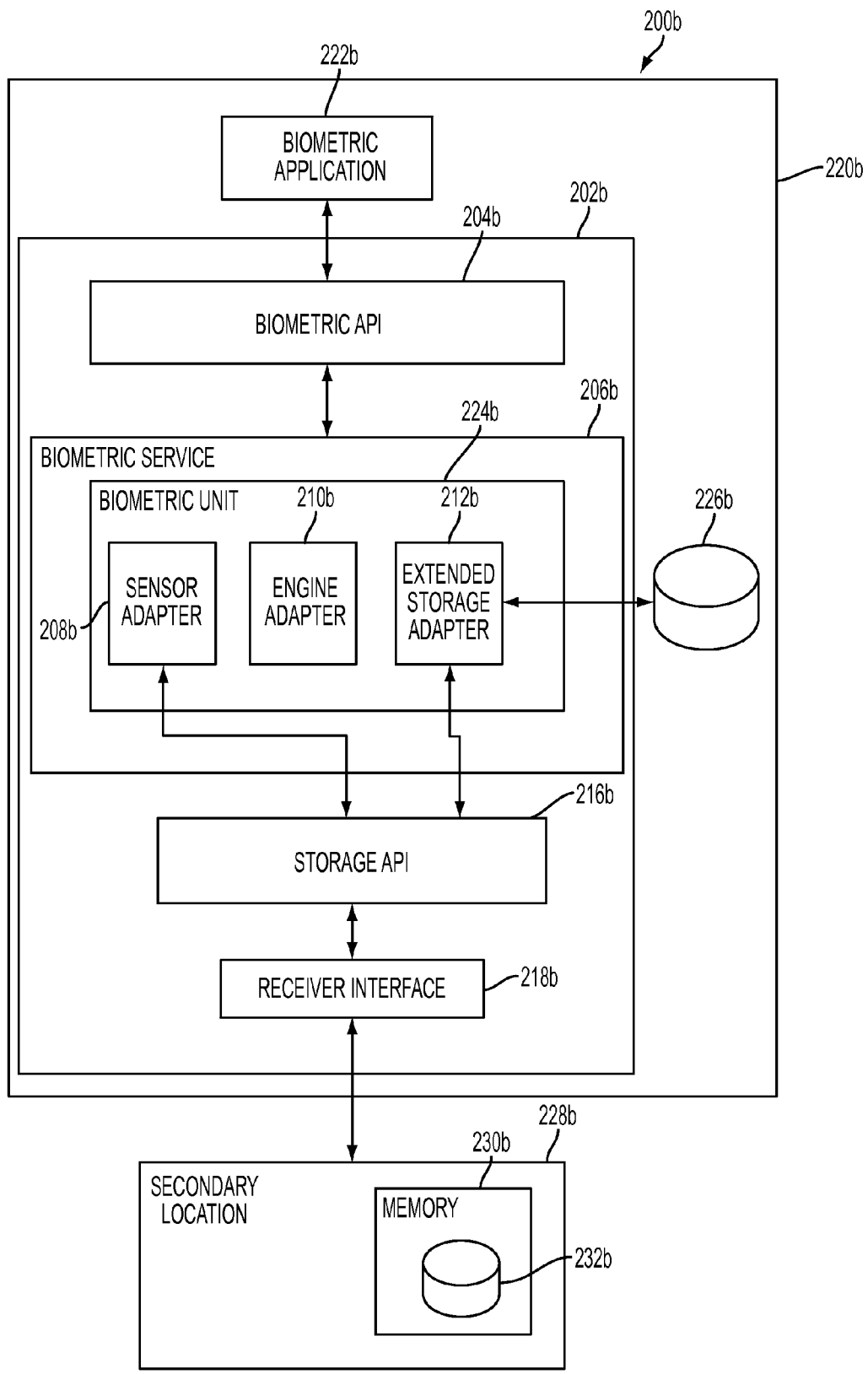
FIG. 6 illustrates an information handling system.

FIG. 6 illustrates an information handling system 200*b*. The information handling system 200*b* includes a secondary location 228*b* and a biometric database 226*b*. In addition, the information handling system 200*b* has resident and executing thereon a native operating-system environment 220*b* of an extended biometric framework 202*b*. The native operating-system environment can be, for example, an environment provided by the Windows® 7 or Windows® 8 operating system. In a typical embodiment, the extended biometric framework 202*b* is an extended version of WBF. As described in more detail below, the extended biometric framework 202*b* exposes biometric functionality of a biometric sensor to a biometric application 222*b*. As described in more detail below, the implementation illustrated in FIG. 2 enables storage of biometric templates in the secondary location 228*b*. The secondary location 228*b* can be, for example, the biometric sensor or another secondary location such as, for example, another hard drive, an embedded controller, BIOS, and the like.

The extended biometric framework 202*b* includes a biometric API 204*b*, a biometric service 206*b*, and a receiver interface 218*b*. The biometric service 206*b* includes a sensor adapter 208*b*, an engine adapter 210*b*, and an extended storage adapter 212*b* that collectively form a biometric unit 224*b* relative to the biometric sensor. It should be appreciated that, in various embodiments, the biometric service 206*b* can include a plurality of biometric units for a plurality of biometric sensors. However, for simplicity of description and illustration, the biometric service 206*b* is depicted as only including the biometric unit 224*b* for the biometric sensor.

As shown, the secondary location 228*b* includes memory 230*b* on which a secondary database 232*b* is stored. The secondary database 232*b* can be, for example, a sensor database as described with respect to FIG. 2. The sensor database 232*b* can also be, for example, a database on a hard drive, embedded controller, in BIOS, or the like. In various embodiments, rather than be part of the information handling system 200*b* as illustrated, the secondary location 228*b* can be external to the information handling system 200*b* and communicably coupled thereto via a communication standard such as, for example, Universal Serial Bus (USB).

In a typical embodiment, the extended biometric framework 202*b* has been extended as described with respect to the biometric framework 102 of FIG. 1 and the extended biometric framework 202 of FIG. 2 and, as a result, enables additional functionality as described with respect to FIG. 2. Specifically, this additional functionality is enabled by the extended storage adapter 212b, a storage API 216b, and the receiver interface 218b. In particular, the storage API 216b has been added to the extended biometric framework 202b. In addition, the extended storage adapter 212b has been extended to interface with the storage API. Further, the receiver interface 218b has been added and disposed between the storage API 216b and the secondary location 228b.

In various embodiments, the receiver interface 218b can be an extended WBDI driver such as, for example, the extended WBDI driver 218 of FIG. 2. In various embodiments in which the secondary location 228b does not correspond to a biometric sensor, the receiver interface 218b can be an interface that is operable to receive calls from the storage API 216b and, in that way, abstract particulars of the secondary location 228b from the storage API 216b. As described with respect to the storage API 214 of FIG. 2, the storage API 214b specifies functions, data structures, object classes, and/or variables related to storing biometric templates in the secondary database 232b. The extended storage adapter 212b has been extended to call the storage API 216b whenever biometric templates are to be stored. The receiver interface 218b receives calls made via the storage API 216b and, in response, stores biometric templates in the secondary database 232b as instructed.

For example, after creation of a new biometric template by the engine adapter 210b, the extended storage adapter 216b can store the new biometric template in the biometric database 226b per WBF standard procedure and, in addition, call the storage API 216b so that the new biometric template is also stored in the sensor database 232b. In that way, the extended storage adapter 212b enables concurrent storage of the new biometric template in multiple locations: the biometric database 226b and the secondary database 232b. In a typical embodiment, each biometric template is stored in the secondary database 232b such that the biometric template is accessible on a per-user basis.

Therefore, the storage API 214b logically abstracts how the biometric templates are stored in the secondary database 232b from the extended storage adapter 212b. Consequently, the extended storage adapter 212b need not directly interface with either the receiver interface 218b or the secondary location 228b. In a typical embodiment, this exemplary advantage eliminates any need to define a new storage adapter for each biometric unit such as, for example, the biometric unit 224b, or each secondary location such as, for example, the secondary location 228b. Rather, the extended storage adapter 212b can be common across all biometric units and storage locations.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    on an information handling system, providing a biometric framework in a native operating-system environment thereof, the biometric framework comprising a biometric service, a biometric device interface (BDI), and a BDI driver;
    wherein the native operating-system environment is an operating-system environment in which the biometric framework is designed to operate;
    wherein the biometric service comprises a biometric unit relative to a biometric sensor;
    wherein the biometric unit comprises a sensor adapter, an engine adapter, and a storage adapter;
    on the information handling system, extending the biometric framework to store biometric templates in a secondary database maintained in a secondary location, the extending comprising extending the storage adapter to support storage in the secondary location; and
    on the information handling system, accessing the secondary database from outside the native operating-system environment of the biometric framework.

2. The method of claim 1, comprising, responsive to creation of a new biometric template:
    storing the new biometric template in a biometric database on the information handling system; and
    storing the new biometric template in the secondary database.

3. The method of claim 1, wherein the extending comprises:
    adding a storage application programming interface (API);
    extending the storage adapter to make calls to the storage API; and
    adding a receiver interface to receive calls via the storage API.

4. The method of claim 3, comprising:
    wherein the adding comprises adding the storage API to the BDI;
    wherein the receiver interface comprises an extended BDI driver; and
    wherein the secondary database comprises a sensor database on the biometric sensor.

5. The method of claim 1, comprising:
    performing biometric authentication from outside the native operating-system environment via the accessed secondary database.

6. The method of claim 5, wherein the accessing and the performing occur in a pre-boot environment.

7. The method of claim 1, comprising at least one of:
    restoring a biometric database on the information handling system via the secondary database; and
    migrating biometric templates stored on the secondary database to a new environment.

8. The method of claim 1, comprising:
    wherein the biometric service comprises a plurality of biometric units; and
    utilizing the extended storage adapter across the plurality of biometric units.

9. The method of claim 1, wherein the secondary database comprises a database record for each biometric template stored therein.

10. The method of claim 9, wherein at least one database record of the secondary database comprises additional data not stored in a biometric database of the information handling system.

11. The method of claim 10, wherein the additional data comprises secret data for authentication purposes in a non-native environment.

12. An information handling system, comprising:
    a processing unit, wherein the processing unit is operable to:
        provide a biometric framework in a native operating-system environment thereof, the biometric framework comprising a biometric service, a biometric device interface (BDI), and a BDI driver;

wherein the native operating-system environment is an operating-system environment in which the biometric framework is designed to operate;

wherein the biometric service comprises a biometric unit relative to a biometric sensor;

wherein the biometric unit comprises a sensor adapter, an engine adapter, and a storage adapter;

extend the biometric framework to store biometric templates in a secondary database maintained in a secondary location, the extension comprising extension of the storage adapter to support storage in the secondary location; and access the secondary database from outside the native operating-system environment of the biometric framework.

13. The information handling system of claim 12, wherein the processing unit is operable to, responsive to creation of a new biometric template:

store the new biometric template in the secondary database; and store the new biometric template in a biometric database on the information handling system.

14. The information handling system of claim 12, wherein the extension comprises:

addition of a storage application programming interface (API);

extension of the storage adapter to make calls to the storage API; and addition of a receiver interface to receive calls via the storage API.

15. The information handling system of claim 14, comprising:

wherein the addition comprises addition of the storage API to the BDI;

wherein the receiver interface comprises an extended BDI driver; and wherein the secondary database comprises a sensor database on the biometric sensor.

16. The information handling system of claim 12, wherein the processing unit is operable to:

perform biometric authentication from outside the native operating-system environment via the accessed secondary database.

17. The information handling system of claim 12, wherein:

the biometric service comprises a plurality of biometric units; and the processing unit is operable to utilize the extended storage adapter across the plurality of biometric units.

18. The information handling system of claim 12, wherein the secondary database comprises a database record for each biometric template stored therein.

19. The information handling system of claim 18, wherein:

at least one database record of the secondary database comprises additional data not stored in a biometric database of the information handling system; and the additional data comprises secret data for authentication purposes in a non-native environment.

20. A computer-program product comprising a non-transitory computer-usable medium having computer-readable program code embodied therein, the computer-readable program code adapted to be executed to implement a method comprising:

providing a biometric framework in a native operating-system environment thereof, the biometric framework comprising a biometric service, a biometric device interface (BDI), and a BDI driver;

wherein the native operating-system environment is an operating-system environment in which the biometric framework is designed to operate;

wherein the biometric service comprises a biometric unit relative to a biometric sensor;

wherein the biometric unit comprises a sensor adapter, an engine adapter, and a storage adapter;

extending the biometric framework to store biometric templates in a secondary database maintained in a secondary location, the extending comprising extending the storage adapter to support storage in the secondary location; and accessing the secondary database from outside the native operating-system environment of the biometric framework.

* * * * *